(12) United States Patent
Andrews et al.

(10) Patent No.: US 7,593,024 B2
(45) Date of Patent: Sep. 22, 2009

(54) SCREEN CALIBRATION FOR DISPLAY DEVICES

(75) Inventors: Gregory P. Andrews, Rochester, MN (US); Zachary A. Garbow, Rochester, MN (US); Robert H. Hamlin, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 11/191,410

(22) Filed: Jul. 28, 2005

(65) Prior Publication Data

US 2006/0158425 A1 Jul. 20, 2006

Related U.S. Application Data

(60) Provisional application No. 60/644,395, filed on Jan. 15, 2005.

(51) Int. Cl.
*G09G 5/00* (2006.01)
*G09G 5/22* (2006.01)
*G09G 5/30* (2006.01)

(52) U.S. Cl. .................................................. 345/619
(58) Field of Classification Search .................. 345/619
See application file for complete search history.

(56) References Cited

U.S. PATENT DOCUMENTS

| | | | | |
|---|---|---|---|---|
| 5,812,705 | A * | 9/1998 | Wang et al. ................... | 382/294 |
| 7,027,055 | B2 * | 4/2006 | Anderson et al. ............ | 345/473 |
| 7,051,040 | B2 * | 5/2006 | Easwar ......................... | 707/102 |
| 7,208,733 | B2 * | 4/2007 | Mian et al. ................... | 250/330 |
| 2001/0022615 | A1 * | 9/2001 | Fernandez et al. ........... | 348/143 |

(Continued)

FOREIGN PATENT DOCUMENTS

JP  11271441  * 10/1999

(Continued)

OTHER PUBLICATIONS

Creating touch-screens anywhere with interactive projected displays Claudio Pinhanez, Rick Kjeldsen, Lijun Tang, Anthony Levas, Mark Podlaseck, Noi Sukaviriya, Gopal Pingali, Multimedia '03: Proceedings of the eleventh ACM international conference on ultimedia.*

(Continued)

*Primary Examiner*—Javid A Amini
(74) *Attorney, Agent, or Firm*—Patterson & Sheridan, LLP

(57) ABSTRACT

Methods and apparatus enable calibration of a display for a particular user thereof. An image displayed such as by an interactive system is adjusted based on physical attributes associated with the user or other characteristics of the user in order to customize the image being displayed. For some embodiments, change to the image includes dynamically resizing and/or repositioning a projected display based on the size and reach of the user to make items shown in the display such as menus or hyperlinks more easily accessible to the user. Input from a camera of the interactive system can be utilized to detect the attribute such as a height of the user for correlation to a typical reach of the user. In operation, the interactive system can therefore dynamically adapt to each unique user as different users approach and interact with the interactive system by automatic calibration of the image being displayed.

17 Claims, 18 Drawing Sheets

Illustration of control and set up of steerable interactive system through a remote computer

U.S. PATENT DOCUMENTS

| | | | |
|---|---|---|---|
| 2004/0046939 A1* | 3/2004 | Nakamura et al. | 353/7 |
| 2004/0111625 A1* | 6/2004 | Duffy et al. | 713/186 |
| 2004/0246167 A1* | 12/2004 | Kumon et al. | 342/70 |
| 2006/0001645 A1* | 1/2006 | Drucker et al. | 345/156 |
| 2006/0149407 A1* | 7/2006 | Markham et al. | 700/108 |
| 2007/0022384 A1* | 1/2007 | Abbott et al. | 715/744 |
| 2007/0127448 A1* | 6/2007 | Buntin et al. | 370/356 |
| 2007/0160307 A1* | 7/2007 | Steinberg et al. | 382/254 |

FOREIGN PATENT DOCUMENTS

| | | | |
|---|---|---|---|
| JP | 2002148334 | * | 5/2002 |

OTHER PUBLICATIONS

A portable system for anywhere interactions Noi Sukaviriya, Rick Kjeldsen, Caludio Pinhanez, Lijun Tang, Anthony Levas, Gopal Pingali, Mark Podlaseck Apr. 2004 CHI '04: CHI '04 extended abstracts on Human factors in computing systems Publisher: ACM.*

RFIG lamps: interacting with a self-describing world via photosensing wireless tags and projectors Ramesh Raskar, Paul Beardsley, Jeroen van Baar, Yao Wang, Paul Dietz, Johnny Lee, Darren Leigh, Thomas Willwacher Aug. 2004 ACM Transactions on Graphics (TOG), vol. 23 Issue 3 Publisher: ACM.*

Embedding Interactions in a Retail Store Environment: The Design and Lessons Learned Noi Sukaviriya, Mark Podlaseck, Rick Kjeldsen, Anthony Levas, Gopal Pingali, Claudio Pinhanez To appear in Proc. of the Ninth IFIP International Conference on Human-Computer Interaction (Interact'03). Zurich, Switzerland. Sep. 2003.*

User-Following Displays Gopal Pingali, Claudio Pinhanez, Tony Levas, Rick Kjeldsen, Mark Podlaseck Proc. of the IEEE International Conference on Multimedia and Expo 2002 (ICME'02), Lausanne, (Switzerland) , Aug. 26-29, 2002.*

Interacting with Steerable Projected Displays Rick Kjeldsen, Claudio Pinhanez, Gopal Pingali, Jacob Hartman, Tony Levas, Mark Podlaseck Proc. of the 5th International Conference on Automatic Face and Gesture Recognition (FG'02), Washington (DC), May 20-21, 2002.*

Creating Ubiquitous Interactive Games Using Everywhere Displays Projectors Claudio Pinhanez Proc. of the International Workshop on Entertainment Computing (IWEC'02), Makuhari, Japan May 14-17, 2002.*

Rick Kjeldsen et al., "Dynamically Reconfigurable Vision-Based User Interfaces," IBM T. J. Watson Research Center.

Ramesh Raskar et al., "iLamps: Geometrically Aware and Self-Configuring Projectors," appears in ACM SIGGRAPH 2003 Conference Proceedings.

"Mobile Computing," http://research.ibm.com/compsci/project_spotlight/mobile/.

* cited by examiner

Figure 1. Block diagram of a steerable interactive system.

Figure 2. Flow-chart of a method for sensing interactions and responding through displays in a steerable interactive system Figure 3. Instantiation of a steerable interactive system based on video projector, redirection device, camera Figure 4. Flow-chart of a method for sensing and responding through moveable video projector and camera Figure 5. Integrated assembly for a steerable interactive system Figure 6. Computer enclosure assembly for a steerable interactive system Figure 7. Pan-tilt head assembly for a steerable interactive system Figure 8. Projector enclosure assembly for a steerable interactive system Figure 9. Details of optical enclosure and projector enclosure assembly for a steerable interactive system Figure 10. Camera bracket and camera filter in an assembly for a steerable interactive system Figure 11. Illustration of control and set up of steerable interactive system through a remote computer Figure 12. Flow-chart of a method for calibrating an instantiation of a steerable interactive system from a remote location

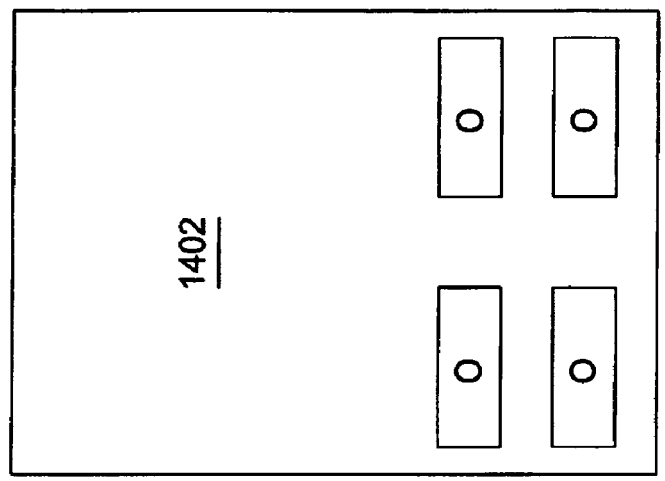
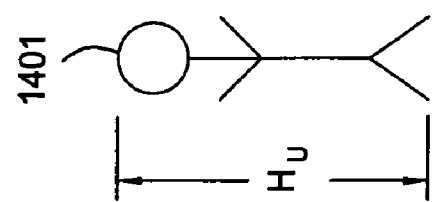
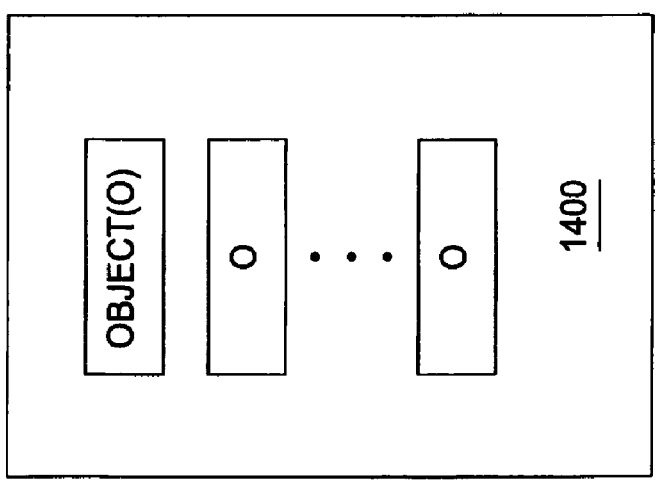
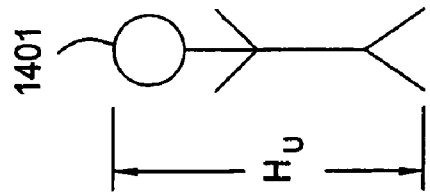
FIG. 14

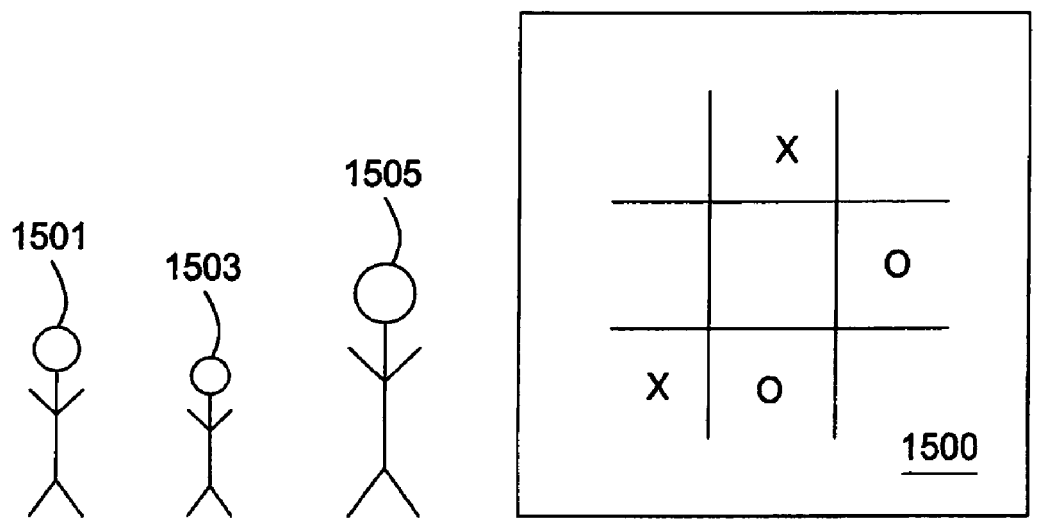
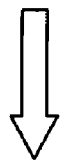
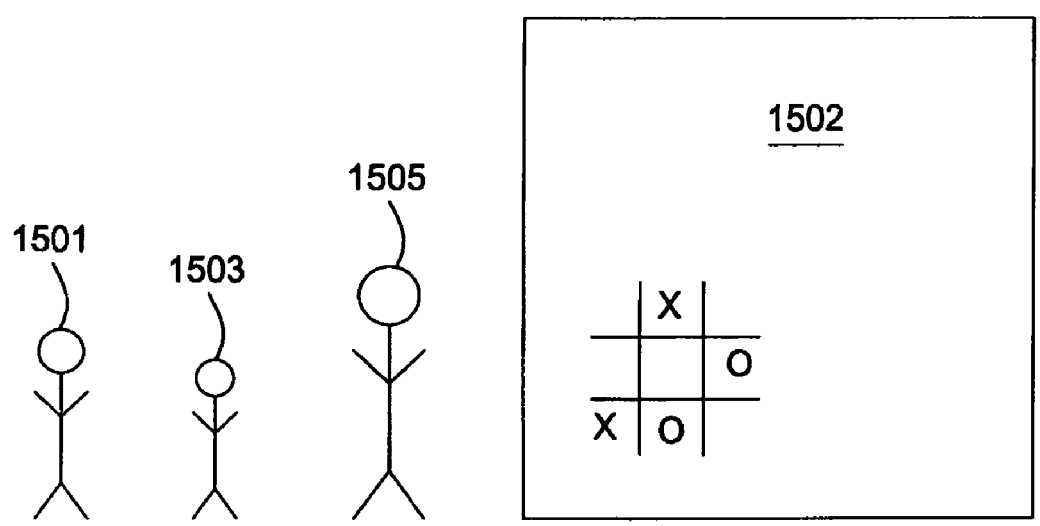
FIG. 15

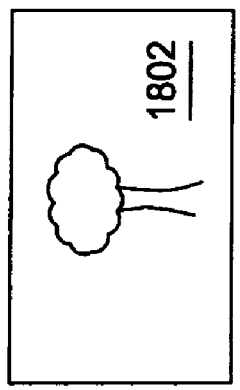
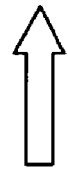
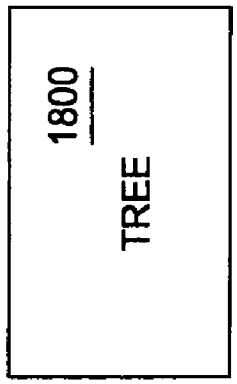
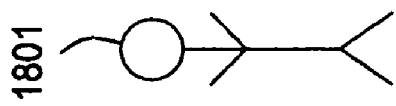
FIG. 18

SCREEN CALIBRATION FOR DISPLAY DEVICES

CROSS REFERENCE TO RELATED APPLICATIONS

This application is related to Application Ser. No. 60/644,395, filed Jan. 15, 2005, entitled "Method and Apparatus for Steerable Interactive System," which is herein incorporated by reference in its entirety.

BACKGROUND OF THE INVENTION

1. Field of the Invention

The invention generally relates to display devices.

2. Description of the Related Art

Ubiquitous computing offers a concept of growing popularity. In one example for ubiquitous computing, an interactive system includes a projector that distorts the image before projection so that a projected version of the image is not distorted. The image can be displayed at multiple locations along a surface or multiple surfaces and can move from one location to another location while remaining undistorted. Interactions between individuals and the system can occur by interactive input, which can include use of devices such as hyperlinks included in the projected image. Other components, such as a camera, can be incorporated into the system to provide for interactive operation. Further, the system can be steerable by use of the projector combined with a moveable mirror and moveable camera to realize maximal coverage in three dimensional spaces for display and interactivity.

Users of such an interactive system are not all the same due to unique characteristics or traits of each user. Consequently, one configuration of the image displayed does not accommodate all users. In other words, users with certain features can experience difficulty or discomfort interacting with portions of the image such as menus that are more accessible to other users having different features.

For example, the users can range in size from under three feet tall to over seven feet tall. This range in size of a particular user determines the reach and comfortable height for that user to interact with the image displayed by the system. Ability of the user to interact with the system can be affected by other factors such as when the user is in a wheelchair, is handicapped or is a child. Additionally, the user of the system can be a group of multiple individuals thereby further complicating what defines an appropriate fit of the image to the user.

Therefore, there exists a need for an interactive system capable of calibrating or customizing an image being displayed in order to better accommodate a user. A further need exists for an interactive system that adjusts the size, layout, and/or location of an image being displayed to make the image more easily accessible to a user based on sensed attributes of that particular user.

SUMMARY OF THE INVENTION

The invention generally enables calibration of a display for a particular user thereof. An image displayed such as by an interactive system is adjusted based on physical attributes associated with the user or other characteristics of the user in order to customize the image being displayed. For some embodiments, change to the image includes dynamically resizing and/or repositioning a projected display based on the size and reach of the user to make items shown in the display such as menus or hyperlinks more easily accessible to the user. Input from a camera of the interactive system can be utilized to detect the attribute such as a height of the user for correlation to a typical reach of the user. In operation, the interactive system can therefore dynamically adapt to each unique user as different users approach and interact with the interactive system by automatic calibration of the image being displayed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 14 depicts a calibration of an image displayed at constant dimensions by rearranging objects shown within the image based upon a determination of a user's height.

FIG. 15 depicts an image calibrated for a user that is a group of individuals.

FIG. 18 depicts a calibration of an image for a user by changing a content of the image.

DETAILED DESCRIPTION OF THE PREFERRED EMBODIMENTS

Figure 1:
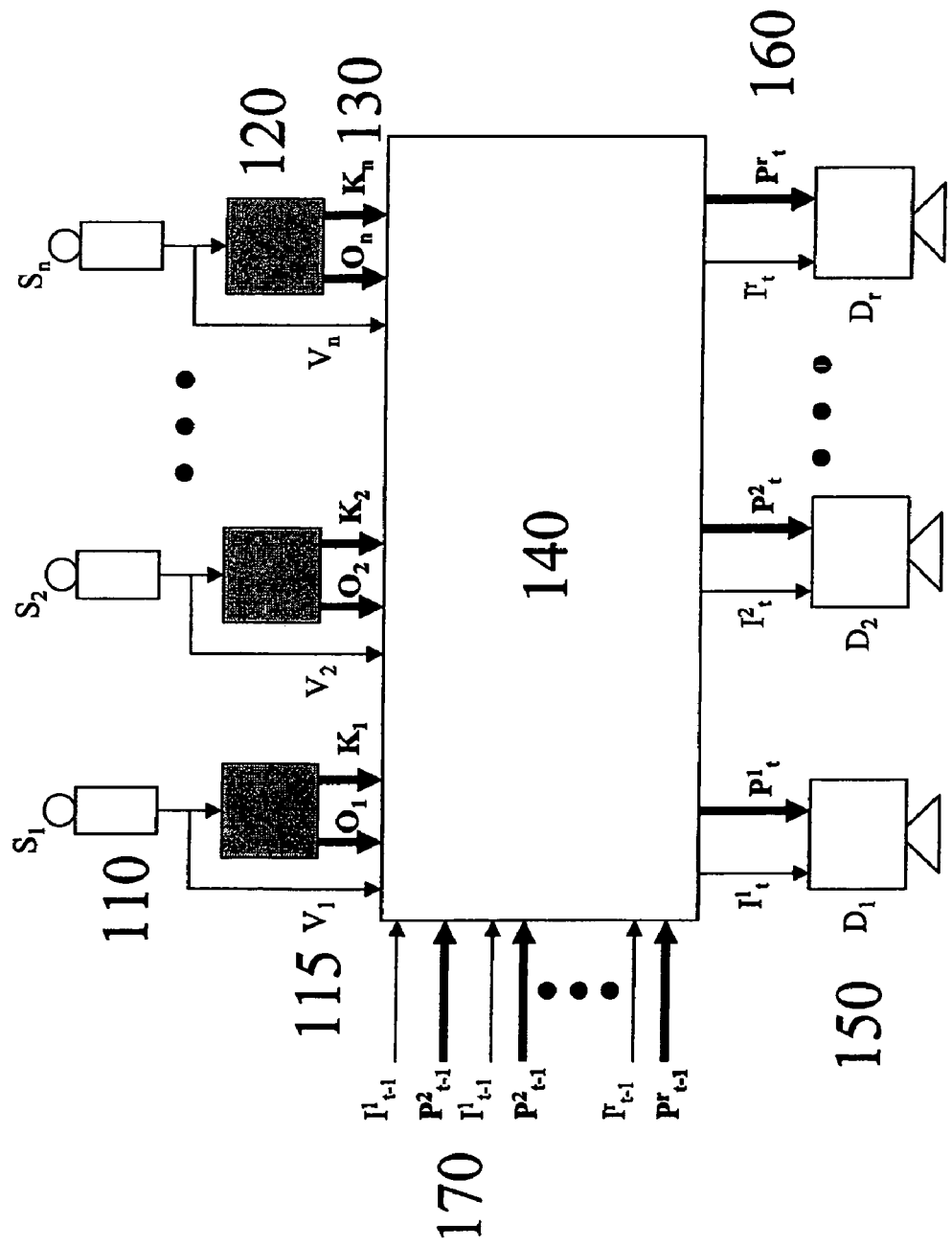
FIG. 1 depicts a block diagram of an interactive system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of signal-bearing media. Illustrative computer readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Embodiments of the invention can be utilized with a display device to calibrate the display device for a particular user. The display device can be part of an interactive system. Accordingly, the following discussion describes an interactive system generally, an embodiment for providing the interactive system and calibration of a display for a user.

Exemplary Interactive System and Method

FIG. 1 depicts a block diagram of a steerable interactive system that comprises a set of sensors 110, a set of sensor processors 120, a display controller 140, and a set of display devices 150. The collection of sensors 110 sense and monitor various parts of an environment. The sensors 110 can be of different types—for instance, some of the sensors may be optical cameras, others may be radio frequency identification tags, still others may be microphones, and yet others may be pressure sensors. Each of the sensors monitors different parts of an environment. For example, in an environment such as a retail store, different cameras may be looking at different aisles in the store. Radio frequency identification tags may be present on products on the shelves in the store. Pressure sensors may be present in certain areas such as the entrance of an aisle. Microphones may be present at select locations on walls with an "ask for help here" sign next to them. The foregoing illustrates, by way of example, how different types of sensors may sense and monitor different activities that take place in an environment.

The environment may also contain a variety of display devices 150. For example, a retail store may have large plasma displays on some walls. Smaller liquid crystal displays may be present in several locations on the shelves. Some of these displays can be on railings along the shelves and may provide for relocation to different portions of the shelf through electronic control. Yet another type of display can be a video projector that projects on a wall, on an area of the floor, etc. Some of these projectors may be moveable, by way of having an attached redirection device that effectively makes the projector it is attached to a moveable projector. These moveable projectors can be redirected to display images on different surfaces in the environment.

The invention enables sensing of objects and their interactions in the environment through the sensors 110, and enables changing the location, orientation, and content of one or more images in response to the sensed interactions by means of the display devices 150. To sense objects and their interactions, the data streams 115 from the sensors 110 is processed by the sensor processors 120. Each sensor processor outputs a set of objects O and a set of interaction parameters K together labeled 130 in FIG. 1. The set of object parameters O may comprise, for instance, the number of objects, the location of each object, and the label of each object. For instance, in a retail environment, the objects may be human beings, specific products, shopping carts, etc. The set of interaction parameters K may comprise, for instance, the number of interactions detected, the location of each interaction, and the type of interaction. For instance, in a retail environment, examples of interactions may be a person walking into an aisle, a shopper picking up an object, a user touching a display, or a cart traversing the aisle.

The set of sensor processor outputs 130 are received by a display controller 140, along with the data streams 115. At each instance of time "t", the display controller also has several input display device parameters 170 corresponding to the status of the display devices 150 at the previous instance of time "t-1". The parameters 170 include an image I displayed by the display devices, and set of parameters P defining the position, size, and orientation of the displays. Based on the sensor processor outputs 130 and the display device parameters 170 at the previous instance of time, the display device determines the new display device parameters 160 for the current instance of time. These include the image I to be currently displayed by each display device and the set of position parameters P for that device. Thus, the display controller determines the content, location and orientation of the images displayed in the environment based on the sensed objects and interactions in the environment. For example, in a retail environment, the entry of a person into an aisle may result in a welcome message displayed on the floor of the aisle in an orientation suitable for viewing by the person. As another example of the functionality of a steerable interactive system, when a person picks up a product in a shelf, the system may use a set of consecutive displays, both static such as television displays, and a moveable projection display to guide the person to a related product on sale. The display controller 140 may be realized as a collection of individual display controllers.

Figure 2:
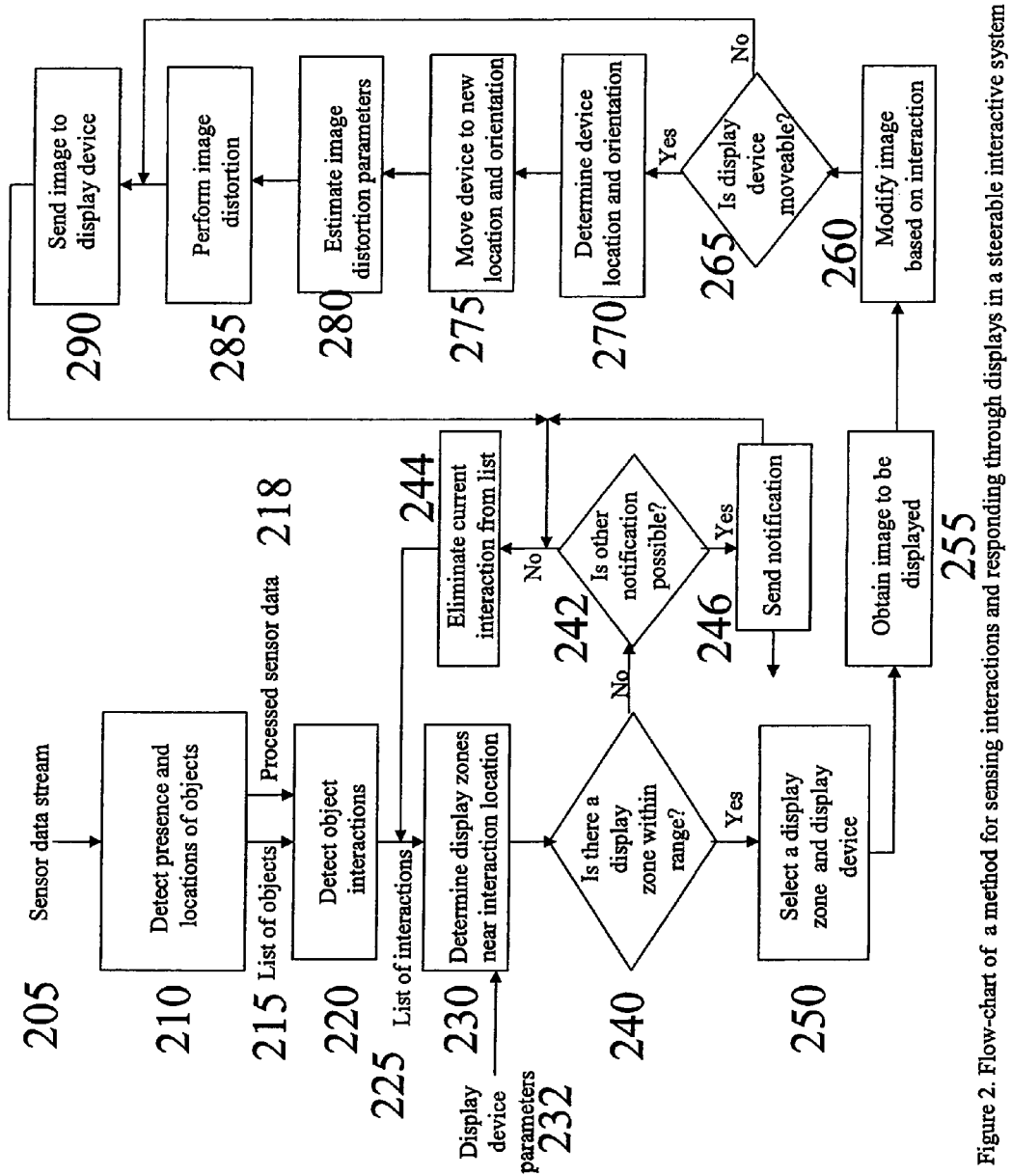
FIG. 2 depicts a flowchart of a method for sensing object interactions and responding to the interactions by providing a substantially undistorted image upon a surface.

FIG. 2 further illustrates a method for sensing interactions and responding through displays in a steerable interactive system. Sensor data streams 205 are processed in a processing step 210, preferably by a sensor processor such as 120 in FIG. 1, to detect presence and locations of objects in an environment. A list of objects 215 and the processed sensor data 218 are then received by another processing step 220, which uses the fore mentioned list 215 and the data 218 to detect object interactions. Each of the interactions in the list of interactions 225 is then processed in step 230 to determine the available display zones near the location of the particular interaction. A display zone indicates that an area in which an image can be displayed by means of one of the display devices in the environment. Examples of display zones include the display area of a static display, and an area on the floor that can be displayed upon by a moveable display. To this purpose, the processing step 230 utilizes the currently available display device parameters 232. A decision step 240 then checks if any of the display zones is within an acceptable range (in terms of parameters such as location, orientation, and size) from the selected interaction. If not, a further decision step 242 checks if it is necessary and possible to provide an alternate notification in response to the sensed interaction. For example, an alternate notification may be a voice message or a beep. If the decision in 242 is affirmative, the appropriate notification is selected and sent through processing step 246. If the decision in 242 is negative, no display device is activated, and the current interaction is removed from the list of interactions in step 244, and the updated list of interactions is processed in step 230, thus continuing a loop that processes all detected interactions.

If the decision in step 240 is affirmative and there are one or more display zones available within an acceptable range for the sensed interaction, a processing step 250 selects one display zone and its corresponding display device among those within the acceptable range. A processing step 255 then obtains an image to be displayed. This image may come from a separate application such as an advertising application or may be created within step 255. The content of the image obtained in 255 is then modified in step 260 based on the sensed interaction. Further, a decision step 265 checks if the selected display device is a static or a moveable display device. If the display device is not moveable, a processing step 290 sends the modified image to the selected display device.

If the decision step 265 determines that the selected display device is moveable, a processing step 270 determines appropriate device location and orientation parameters for the moveable device corresponding to the selected display zone. A processing step 275 then moves the selected display device to its new location and orientation by sending appropriate control signals. Further, step 280 determines the parameters to distort the undistorted image obtained in step 260, such that when displayed by the moveable display device, a substantially undistorted image appears on the selected surface and within the selected display zone. The image distortion is then performed in step 285 and the distorted image is sent to the moveable display device in step 290. The currently selected interaction is then removed from the list of interactions in step 244, and the updated list of interactions is processed in step 230, thus continuing a loop that processes all detected interactions.

Thus, FIG. 2 is a flowchart of a method for sensing object interactions and responding to the interactions by providing a substantially undistorted image upon a surface, in accordance with one embodiment of the invention.

Figure 3:
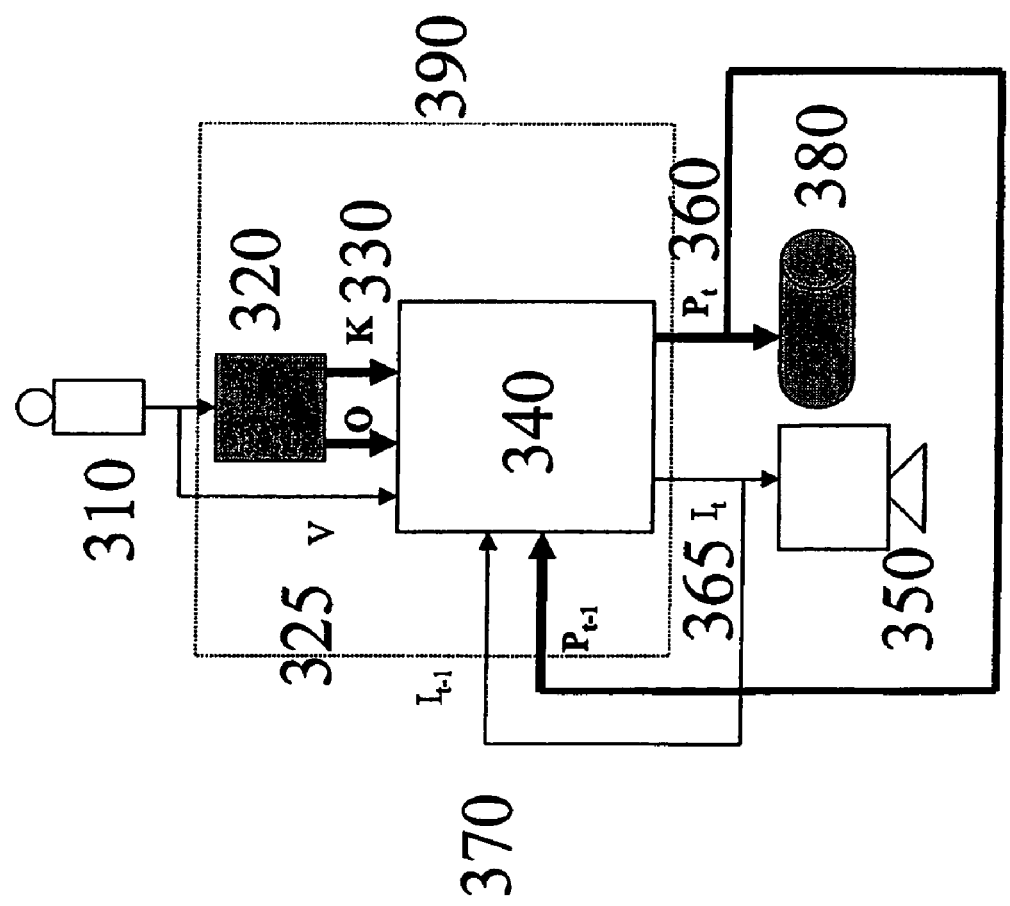
FIG. 3 depicts an instantiation of an interactive system including a video projector, a camera, a redirection device and a computer.

While the foregoing describes the components and a method that can be used to realize a steerable interactive system, one embodiment of such a system is further illustrated in FIG. 3. In this embodiment, the steerable interactive system includes a single video camera 310 as the sensor for sensing the environment; a video projector 350 as the display device in the environment; a redirection device 380, preferably a pan-tilt head, as the device for moving the video projector 350, thus making the projector 350 a moveable projector; and a computer 390 that contains the processing modules needed to realize the steerable interactive system. For instance, the video projector could be a device such as the XJ-450 DLP projector from Casio Inc; the camera could be a device such as the Logitech for Notebooks Pro from Logitech Inc; the pan-tilt head could be a device such as the PTU D46-17 from Directed Perception Inc; the computer could be a notebook computer such as the IBM Thinkpad® T42 from IBM Inc.

The computer 390 includes an image processor module 320 that processes the sequence of images V coming from the camera, and outputs a set of image processor parameters 330 comprising a set of object parameters O and a set of interaction parameters K. Some examples of sensed interactions by the camera include presence of a person in an aisle, the act of picking up a product, or a hand touching the image displayed by the projector. The parameters 330 and the image sequence 325 are processed by a display controller module 340, also contained within the computer 390. The display controller 340 also receives the display device parameters 370 that include the image I displayed by the display device 350, and the parameters P of the redirection device 380 corresponding to the previous time instance t-1. The parameters P can include the pan value, tilt value, pan and tilt speeds, current position and orientation, focus and zoom of the projector, and image distortion parameters. Based on the sensed interactions K, the display controller 340 determines a new image 365 to be displayed by the projector at the current time instance t, as well as the new redirection parameters 360 for the redirection device 380. Thus, this embodiment realizes an instantiation of a steerable interactive system.

Figure 4:
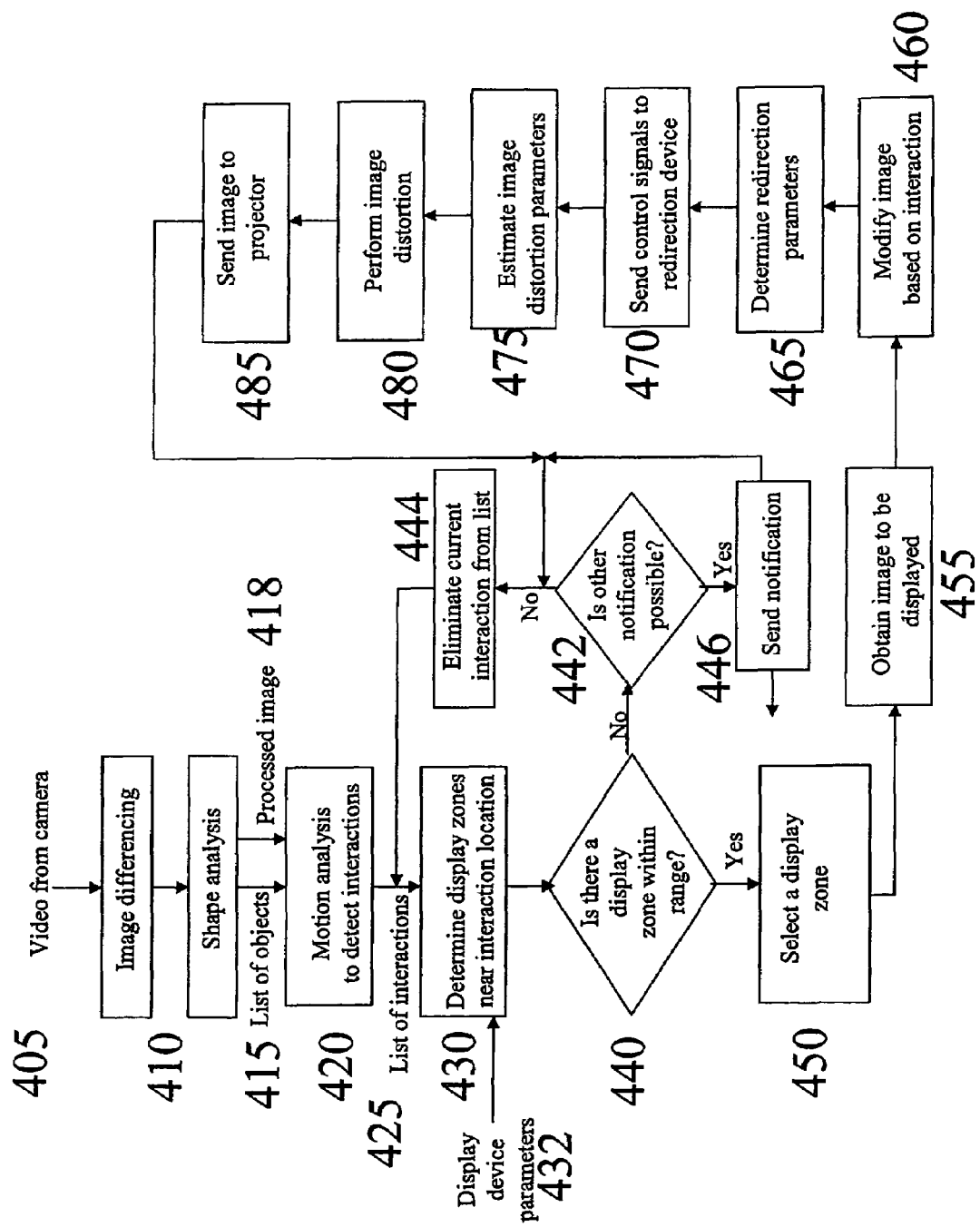
FIG. 4 depicts a flowchart of a method to project a substantially distortion-less image on any of a multiple of surfaces and for providing interaction with the substantially distortion-less image.

FIG. 4 further illustrates a method for sensing interactions and responding through displays in the particular embodiment of the steerable interactive system depicted in FIG. 3. A video stream 405 (consisting of a sequence of images in time) is processed in a set of processing steps 410, 415, preferably by an image processor such as 320 in FIG. 3, to detect presence and locations of objects in an environment. Processing step 410 performs image differencing by computing the difference between a current image seen by the camera and a previous image seen by the camera. In another variant of step 410, the image differencing consists of computing the difference between the image seen by the camera and the image projected by the projector. Following the image differencing in 410, further shape analysis is performed in step 415 on the foreground regions detected in step 410, to obtain a list of objects 415 and the processed image data 418. This data 415 and 418 is then received by another processing step 420, which performs motion analysis based on the fore mentioned list 215 and the data 218 to obtain a list of interactions 425. Each of the interactions in the list of interactions 425 is then processed in step 430 to determine the available display zones near the location of the particular interaction. A display zone indicates that an area in which an image can be displayed by means of the moveable video projector. To this purpose, the processing step 430 utilizes the currently available display device parameters 432. A decision step 440 then checks if any of the display zones is within an acceptable range (in terms of parameters such as location, orientation, and size) from the selected interaction. If not, a further decision step 442 checks if it is necessary and possible to provide an alternate notification in response to the sensed interaction. For example, an alternate notification may be a voice message or a beep. If the decision in 442 is affirmative, the appropriate notification is selected and sent through processing step 446. If the decision in 442 is negative, no display device is activated, and the current interaction is removed from the list of interactions in step 444, and the updated list of interactions is processed in step 430, thus continuing a loop that processes all detected interactions.

If the decision in step 440 is affirmative and there are one or more display zones available within an acceptable range for the sensed interaction, a processing step 450 selects one display zone among those within the acceptable range. A processing step 455 then obtains an image to be displayed. This image may come from a separate application such as an advertising application or may be created within step 455. The content of the image obtained in 455 is then modified in step 460 based on the sensed interaction. Further, a processing step 465 determines appropriate redirection parameters corresponding to the selected display zone. A processing step 470 then moves the projector to its new location and orientation by sending appropriate control signals to the redirection device. Further, step 475 determines the parameters to distort the undistorted image obtained in step 460, such that when displayed by the moveable video projector, a substantially undistorted image appears on the selected surface and within the selected display zone. The image distortion is then performed in step 480 and the distorted image is sent to the moveable display device in step 485. The currently selected interaction is then removed from the list of interactions in step 444, and the updated list of interactions is processed in step 430, thus continuing a loop that processes all detected interactions.

Thus, FIG. 4 depicts a flowchart of a method to project a substantially distortion-less image on any of a multiple of surfaces and for providing interaction with the substantially distortion-less image or response to other interactions in the environment, in accordance with one embodiment of the invention.

Exemplary Assembly for Providing am Interactive System

Figure 5:
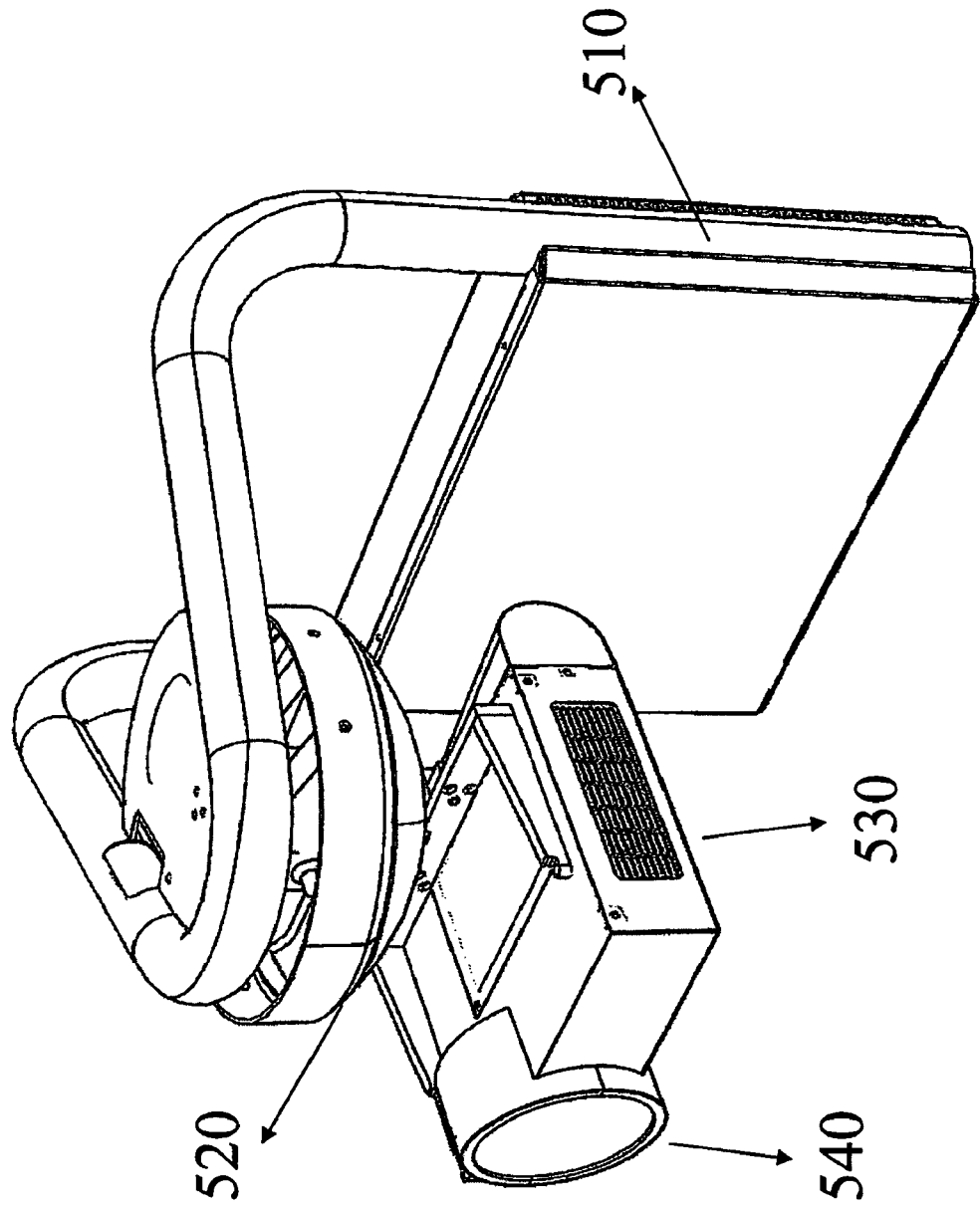
FIG. 5 depicts an integrated assembly for an interactive system that is enabled for effective mounting, modularity, portability, and access for maintenance.

FIG. 5 depicts an integrated assembly for a steerable interactive system that is enabled for effective mounting, modularity, portability, and access for maintenance in accordance with one embodiment of the invention. This embodiment realizes the steerable interactive system depicted in FIG. 3 in a modular and portable fashion. A computer enclosure assembly 510 contains within it the computer used in the steerable interactive system. Further, a pan-tilt head enclosure 520 contains within it a pan-tilt head that is used as the redirection device for the video projector. Additionally, a projector enclosure 530 contains within it the video projector, and an optical enclosure 540 encloses the lens of the projector as well as a video camera that is integrated with the projector and housed within the optical enclosure 540. The following figures and discussion further illustrate aspects of the inventions associated with the enclosures 510, 520, 530, and 540.

FIG. 6A through 6C depict a computer enclosure assembly for a steerable interactive system in accordance with the embodiment illustrated in FIG. 5. The computer enclosure assembly provides an effective mechanical structure for incorporation of a control computer into the steerable interactive system enabling efficient mounting, modularity, portability, and heat ventilation. The assembly 510 also provides structural support for the computer as well as the projector-camera unit with associated motors. The assembly 510 further provides a snap-on assembly that ensures compactness and portability of the system. A unique tubular design provides structural support, a "chimney" for warm air ventilation, and a cable raceway.

Figure 6:
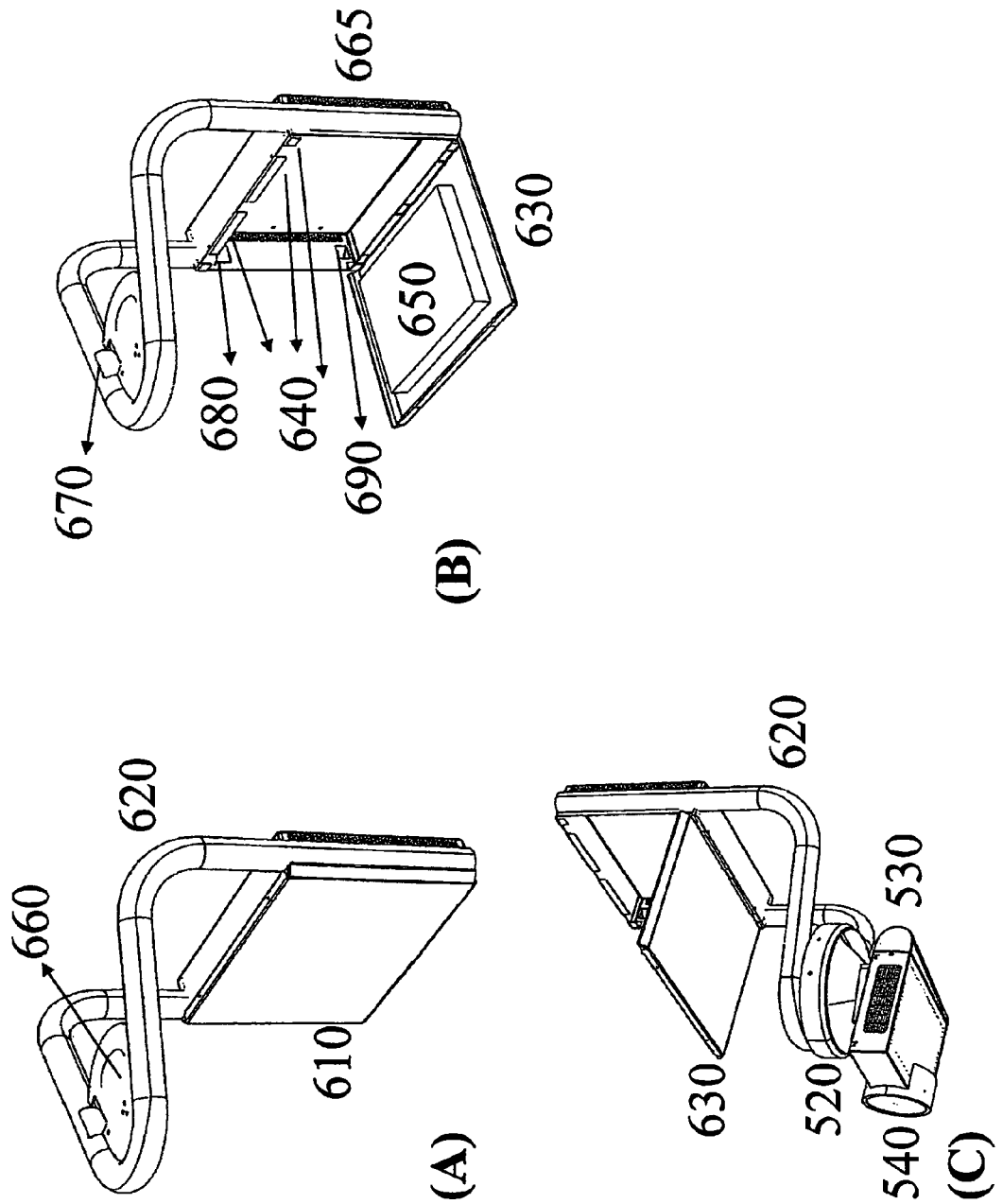
FIG. 6 depicts a computer enclosure assembly for the interactive system shown in FIG. 5.
Figure 7:
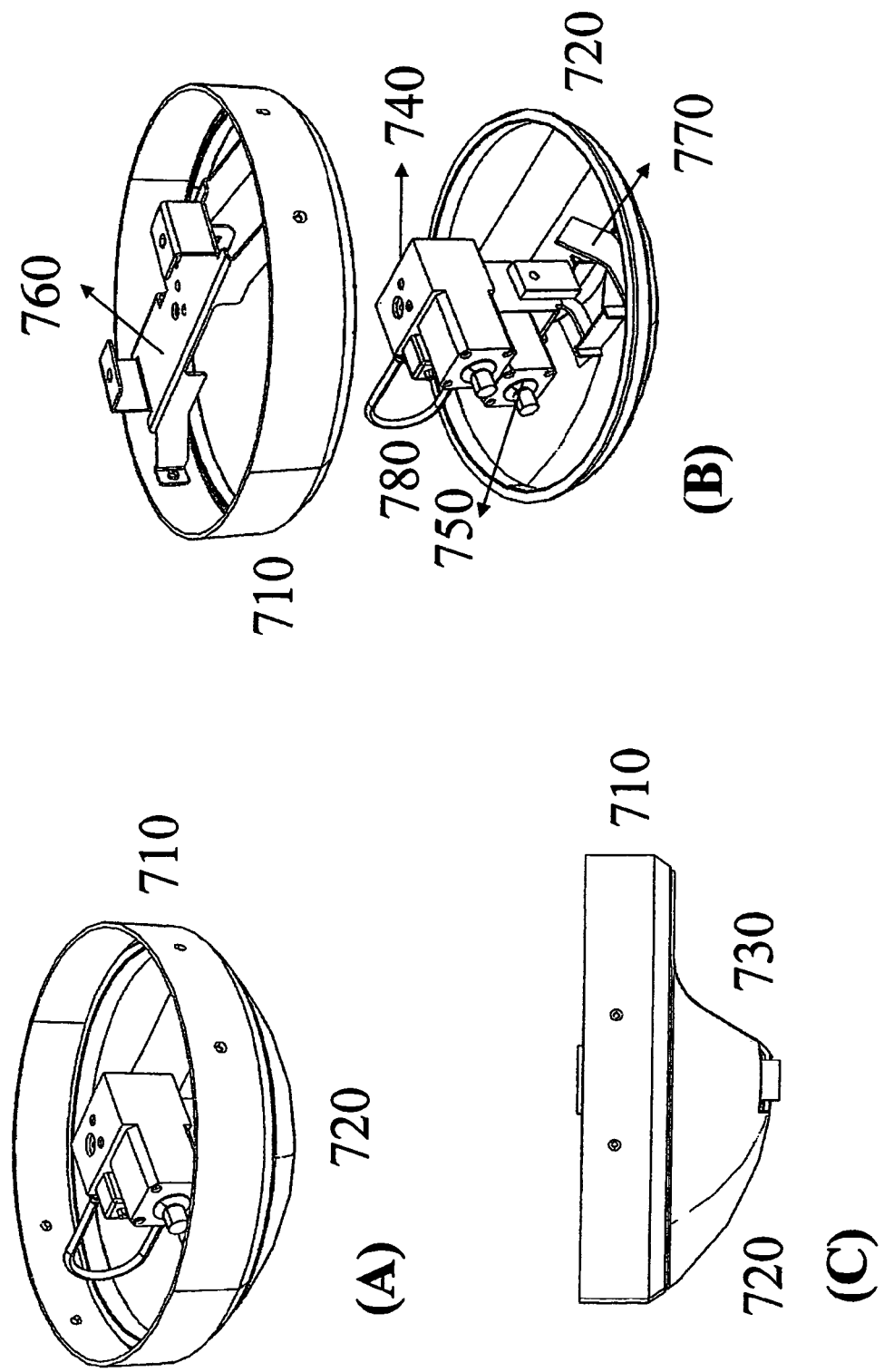
FIG. 7 depicts a pan-tilt head enclosure assembly for the interactive system shown in FIG. 5.

The computer enclosure assembly includes a computer enclosure box 610, a tubular frame 620, and a fixing plate 660 that serves to mount a pan-tilt head assembly to the structure. The enclosure box 610 includes a removable lid 630 that is advantageously designed to be relocated without requiring tools, thus facilitating easy access to and maintenance of the unit. The lid 630 also acts as a tray to work on the computer 650, besides acting as a cover and a support for the computer 650. The tool-less operation of the box is also facilitated by slots 680 that facilitate engagement and disengagement of the lid without requiring hinges. The fixing plate 660 for mounting the pan-tilt unit has an opening 670 on the top of the tubing that acts as a cable port as well as an air-vent. The opening 680 in the computer box 610 acts as an air-inlet, thus enabling the tubing 620 to acts as a chimney for warm air ventilation. The opening 640 in the computer box 610 acts as a cable-inlet, primarily for the power cable of the computer, as the remaining cables from the computer to the projector, camera, and pan-tilt head are internal to the computer enclosure and pass through the tubing 620. The box 610 also has perforated air-vents 665 for further air ventilation. The design of the computer enclosure allows the projector, camera, and pan-tilt head to both hang with the computer above the head as illustrated in FIG. 6 (C) or with the computer below the head as seen in FIG. 5, without requiring to change the computer enclosure assembly 510. This facilitates meeting different mounting requirements in real world environments.

FIGS. 7(A) through 7(D) depict a pan-tilt head enclosure assembly for the steerable interactive system in accordance with the embodiment shown in FIG. 5. An upper ring 710 and a lower shell 720 form the enclosure. The enclosure holds and supports the pan-tilt motors and routes the numerous cables in the steerable interactive system in a manner that achieves maximal pan and tilt coverage while minimizing twist of the cables and the resultant torque, while also providing a means of mounting the steerable interactive system. The lower shell 720 is designed to rotate independently of the upper ring 710, thereby rotating along with the projector during pan and staying stationary with respect to the upper ring 710 during tilt. This eliminates twist of the cables and minimizes the torque in the system.

Two brackets 770 on the bottom of the lower shell 720 are designed to embrace the tilt motor 750 so that the shell 720 pans along with the tilt unit. No screws or other parts are needed to fix the shell to the pan motor, thereby facilitating maintenance, assembly, and disassembly. The FIG. 7 does not show the numerous cables enclosed in the unit. Only one of the pan-tilt unit cables 780 is shown by way of example. A projector-mounting bracket 760 serves two functions: i) connecting the projector enclosure to the pan-tilt unit by attaching to the pan motor 740, and ii) eliminating vibration within the pan-tilt enclosure. Furthermore, an indentation 730 within the lower shell 720 allows full range of motion of the tilt motor while providing room for the cable routing.

Figure 8:
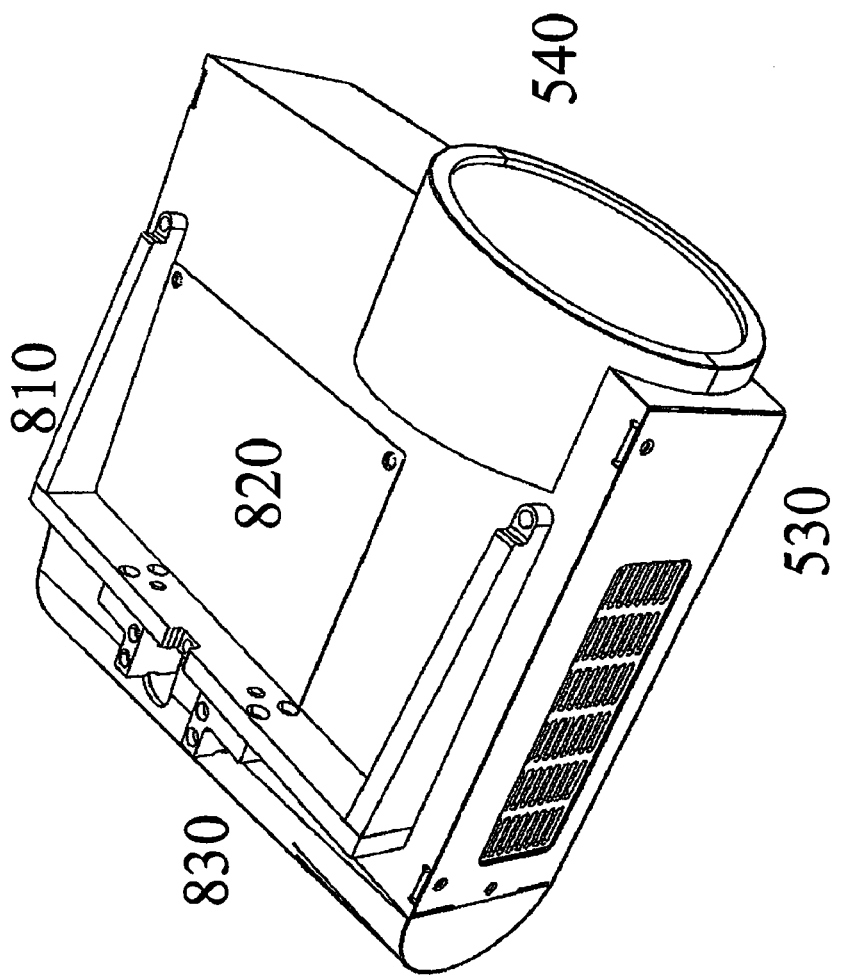
FIG. 8 depicts a projector enclosure assembly for the interactive system shown in FIG. 5.

Furthermore, FIG. 8 depicts the projector enclosure assembly 530 for a steerable interactive system in accordance with the embodiment shown in FIG. 5. The projector enclosure assembly 530 has a projector-mounting bracket 810, a cover 820 that provides easy access to the projector bulb for maintenance purposes, integration of the optical enclosure assembly 540, and a rear cover 830 that also serves as a cable holder.

Figure 9:
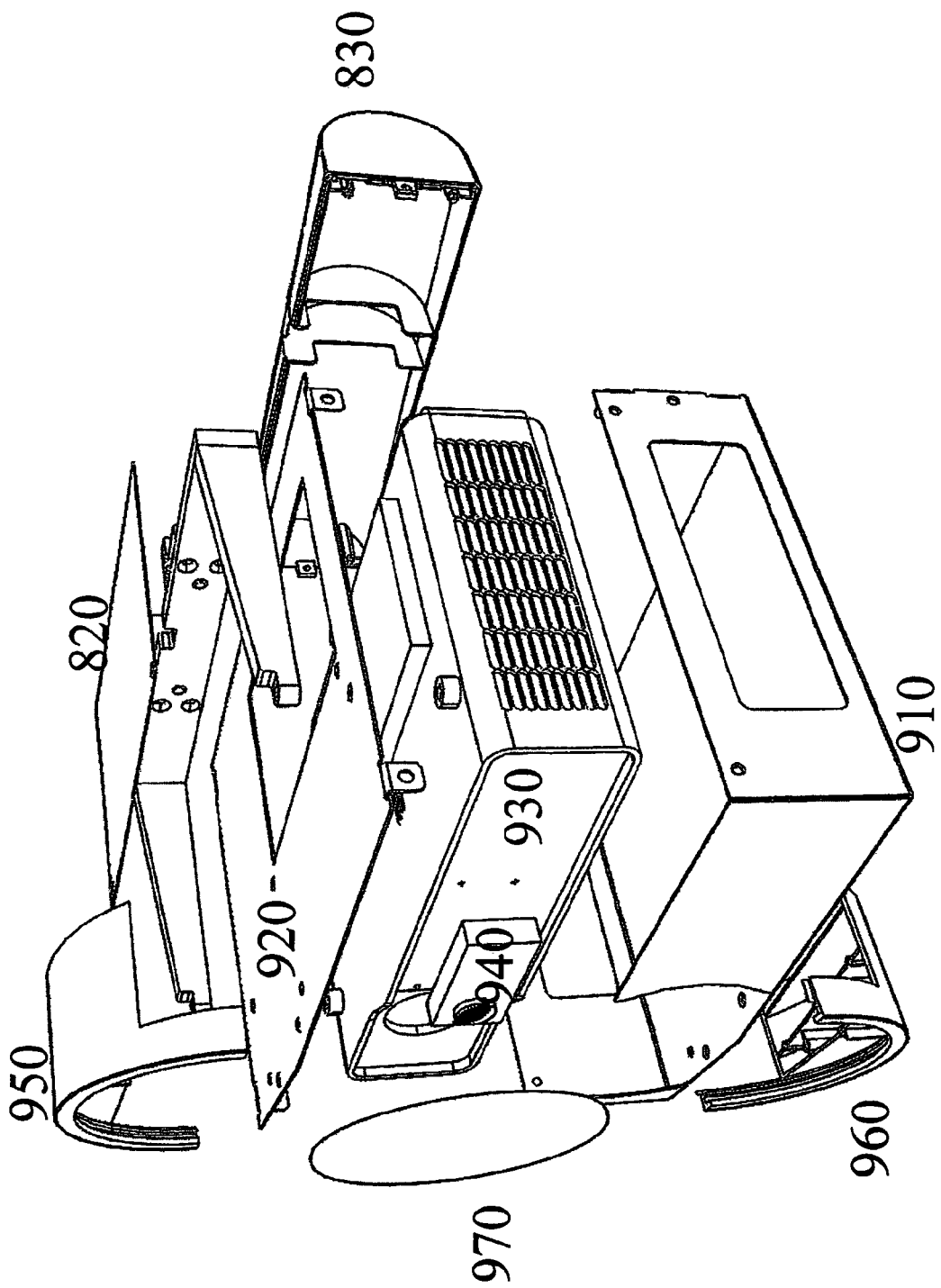
FIG. 9 depicts an optical enclosure assembly for an integrated projector and camera in the interactive system.

FIG. 9 further depicts details of the optical enclosure along with the projector enclosure assembly for an integrated projector and camera. The optical enclosure provides a shared shield for the camera and projector lenses, and also has a unique adapter plate that enables mounting the camera at an angle with respect to the projector such that the viewing angle of the camera is optimized with respect to the projector without the need to adjust the camera. The optical enclosure includes two halves 950 and 960 of lens housing, a lens/dust-shield 970, a camera-tilt-bracket, and a camera filter that are further illustrated in FIG. 10. FIG. 9 also further illustrates the upper cover 920 and the lower cove 910 of the projector assembly enclosure. The design enables effective integration of the projector 930 with the camera 940 so that they are enclosed in the same housing and can be moved together by the pan-tilt head.

Figure 10:
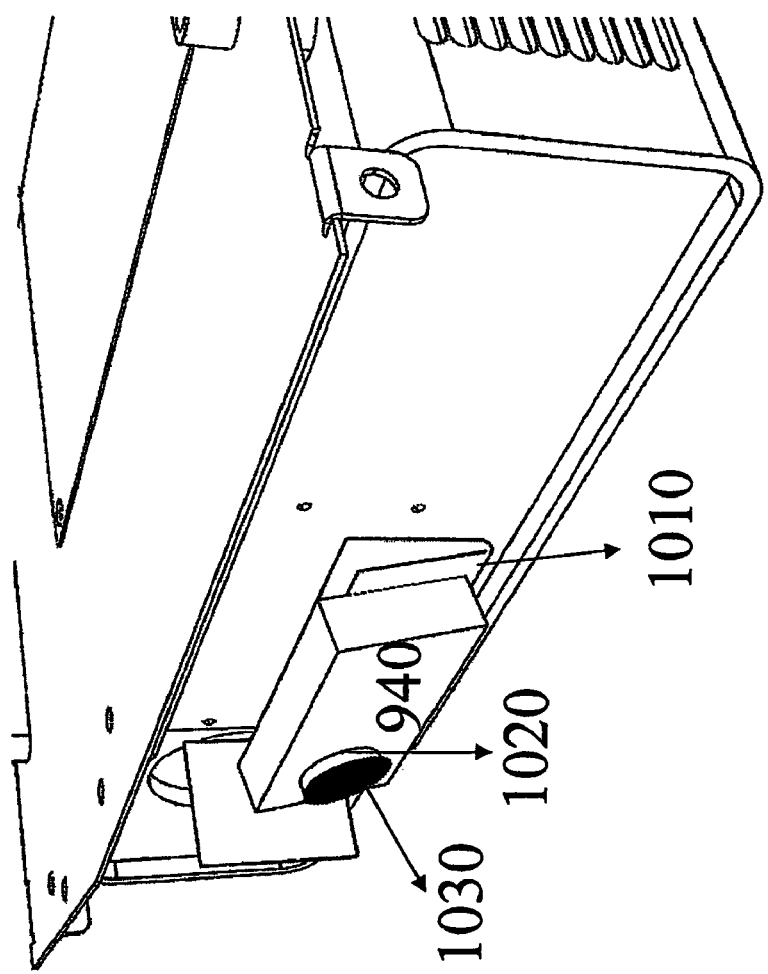
FIG. 10 depicts the camera tilt bracket and camera filter in the interactive system shown in FIG. 5.
Figure 11:
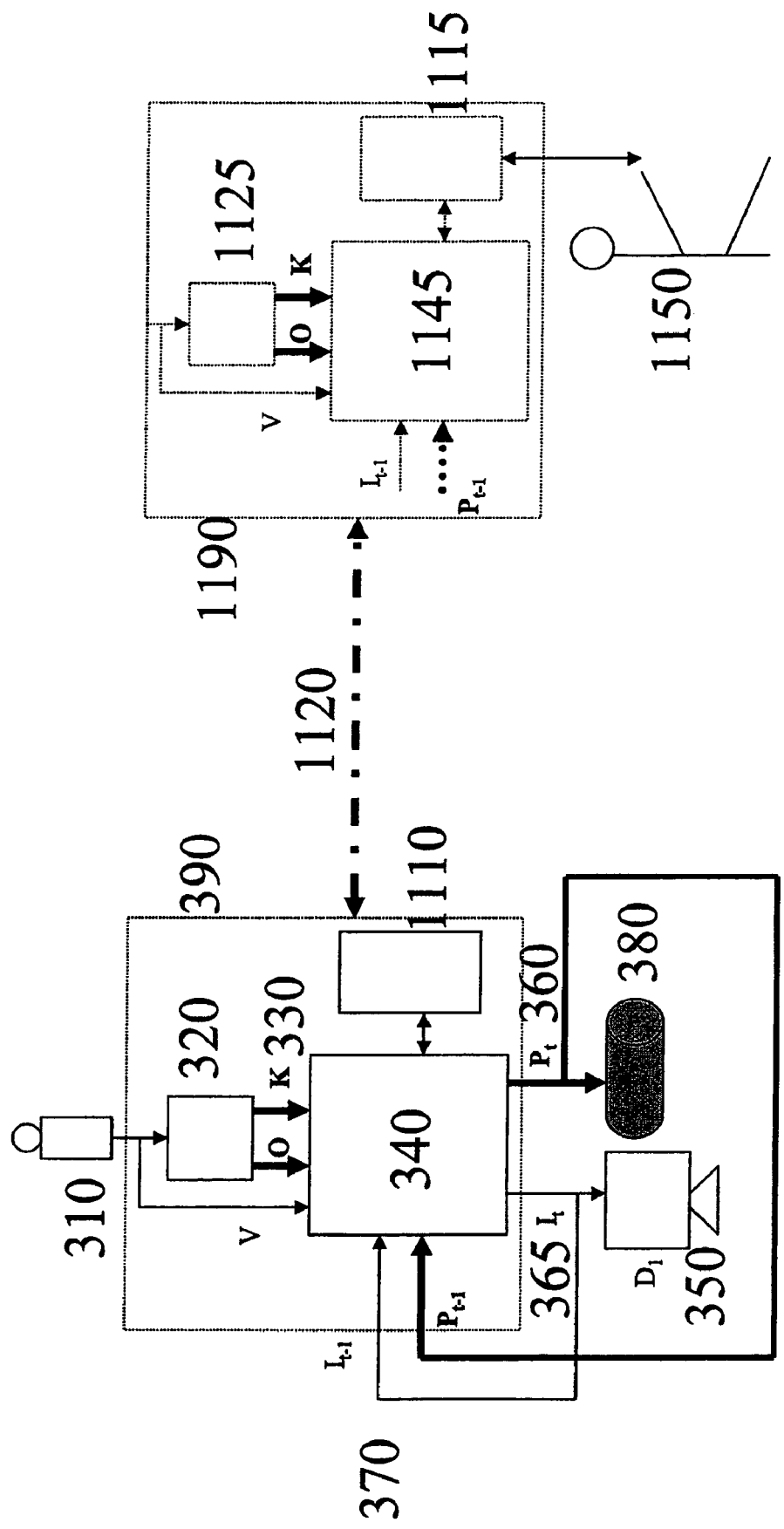
FIG. 11 depicts a block diagram that illustrates control and set up of an interactive system from a remote location.

FIG. 10 depicts the camera tilt bracket and camera filter in a steerable interactive system in accordance with one embodiment of the invention. The camera 940 is mounted on a tilt-bracket 1010. The tilt of the camera with respect to the projector is essential to optimize the viewing angle of the camera with respect to the projector. The adapter plate ensures that the camera is mounted at the optimal viewing angle with respect to the projector at the time of assembly itself, without the need to adjust the camera during operation. An optical filter 1030 covers the camera lens. The filter 1030 is designed to reduce the intensity of the light seen by the camera, in order to eliminate interference between the optics of the projector and the camera.

The local computer 390 can be connected through a network connection 1120 such as an Ethernet or wireless connection to a remote computer 1190. A remote control software such as the PCAnywhere® software from Symantec Inc. enables replication and control of the displays and interfaces on the local computer 390 on the remote computer 1190. For the steerable interactive system, an administrator interface 1110 is designed on the local computer to enable administrator interaction with the system for system set-up, viewing, and control. This interface communicates with the display controller 340 to achieve the display and control functions needed for user interaction. The replication of the entire desktop interface of the local computer 390 on the remote computer 1190 enables access of the administrator interface by a remote administrator 1150 through the replicated interface 1115. Thus, the remote administrator can set up and control the steerable interactive system.

Remote Calibration of an Interactive System

Figure 12:
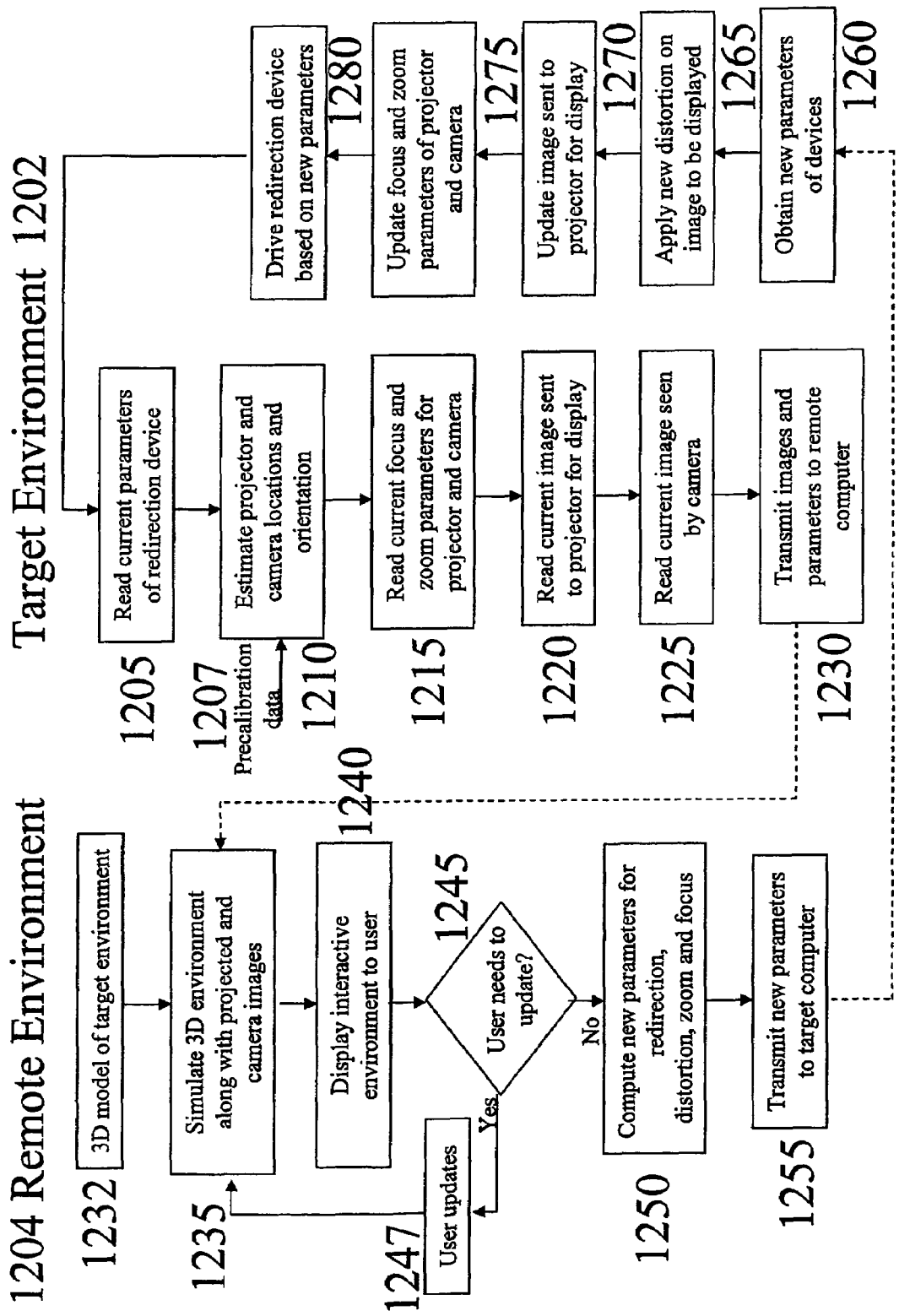
FIG. 12 depicts a flowchart of a method for calibrating an interactive system located in a target environment from a computer located in a remote environment.

FIG. 12 depicts a flowchart of a method for calibrating a steerable interactive system located in a target environment from a computer located in a remote environment. A remote environment 1204 is not visible for calibration purposes from the target environment 1202. The right part of the figure under 1202 depicts the steps performed on the system computer in the target environment while the left part of the figure under 1204 depicts the steps performed by the administrator ("user") on a remote computer in a remote environment. In step 1205, the current parameters of the redirection device are read in the target environment. These parameters from 1205 along with precalibration data 1207 are used in step 1210 to estimate projector and camera locations and orientations. Further, the current focus and zoom parameters of the projector and camera are read in step 1215. The current image sent to the projector for display is then read in step 1220, followed by 1225 which reads the current image seen by the camera. Next, all the parameters and images determined from steps 1205 through 1225 described above are transmitted to the remote computer in step 1230.

The computer in the remote environment 1204 maintains a three dimension "3D" model 1232 of the target environment 1202. Alternatively, a two dimensional model of the target environment 1202 can be used. This model 1232 is beneficially built beforehand based on measurements made in the target environment manually or through automated or semi-automated processes. Additionally, the calibration from the remote computer can be done manually or can be automated. Step 1235 performed in the remote computer, simulates a view of the target environment based on the 3D model 1232 as well as the projected and camera images transmitted from 1230. The simulation 1235 maps the current projector and camera images on to the surfaces in the 3D model of the target environment. Step 1240 portrays the simulated environment to the administrator through an interactive interface. The administrator is able to view and manipulate the current positions of the camera and projector, and correct the location, orientation, size, and distortion of the images through the simulated environment. As the administrator is manipulating a 3D model of the environment, the administrator is able to view the environment without the distortions caused, for example, by mere camera views of the target environment. Whenever the administrator chooses, the administrator can update the current positions of the target camera or projector, and correct the location, orientation, size, or distortion of the projected images through the simulated interactive environment in 1240. If the administrator needs to further update the environment, checked for in step 1245, the updates 1247 made by the administrator are sent as new parameters to 1235 resulting in a new simulation and presentation to the administrator in 1240. When the administrator needs to update no further in 1245, the new parameters for the redirection device, as well as the focus and zoom of the projector and camera, and the image distortion parameters for the projected image in the target environment are computed anew in step 1250, based on the last values selected by the administrator in the simulation environment. The new parameters are then transmitted back to the system computer in the target environment in step 1255.

The new parameters are read in step 1260 on the system computer in the target environment. The new distortion parameters are then applied to the image to be displayed in step 1265. The updated image is sent to the projector for display in step 1270, followed by adjustment of the focus and zoom parameters of the projector and camera in step 1275. Furthermore, the redirection device is driven to a new location based on the received parameters. These updated parameters are then read again by steps 1205 through 1230 and transmitted to the remote computer, enabling the remote administrator to view the changes through the simulation environment. In this fashion, the invention enables a remote administrator to calibrate a steerable interactive system in a target environment.

Calibration of an Interactive System's Display for a User

In one embodiment, an image displayed by an interactive system is changed based on physical attributes associated with a user or other characteristics of the user themselves in order to customize the image being displayed for that particular user. As defined herein, the "user" can be an individual or group of individuals. Further, physical attributes associated with the user can be derived from features of the individual(s) and/or external factors affecting the user's ability to easily interact the image. Accordingly, these physical attributes associated with the user can but do not have to correspond to characteristics of the user since the characteristics of the user include any distinguishing traits, qualities, or properties of the individual(s). For some embodiments, change to the image includes dynamically resizing and/or repositioning a projected display based on the size and reach of the user to make items shown in the display such as menus more easily accessible. In operation, the interactive system can therefore dynamically adapt to each unique user as different users approach and interact with the system by automatic calibration of the image being displayed.

With reference to FIG. 3, automatic calibration of the image being displayed by the projector 350 (or other display device such as a liquid crystal display or plasma display as described above with reference to FIG. 1) based on the user's attributes can occur by using input from the camera 310. In one embodiment, the camera 310 and the image module 320 can detect a standing height of the user at the image being displayed. Such detection can be made by any known method such as making a comparison of images from the camera 310 as described above and in a similar manner as is used to identify when the user is selecting a hyperlink. From information indicative of the user's height that is output as the image processor parameters 330, the display controller module 340 can calculate a typical reach of the user based upon an assumption of the user's arm length in proportion to their height. This assumption is based on the fact that arm length and arm span are highly correlated with height. The display controller 340 determines a new image 365 calibrated for the user to be displayed by the projector 350 at the current time instance, t, as well as the new redirection parameters 360 for the redirection device 380. Specifically, the new image 365 can be reduced or enlarged in size and positioned at a comfortable height for the user such that the user does not need to jump or otherwise move to effectively interact with the image. Alternatively, or in combination with this reduction or enlargement of the image, the layout of items shown in the image may be arranged to provide an interactive region or a focal point of the image at an appropriate location for the user.

For some embodiments, the user's arm can be identified by the camera, and a measurement of a length of the arm can be taken. As one example, the arm can be identified by the camera while the user is waving. This direct measurement of the length of the arm enables a determination of the user's reach and does not require any correlation with the user's height in determining the length of the arm.

Figure 13:
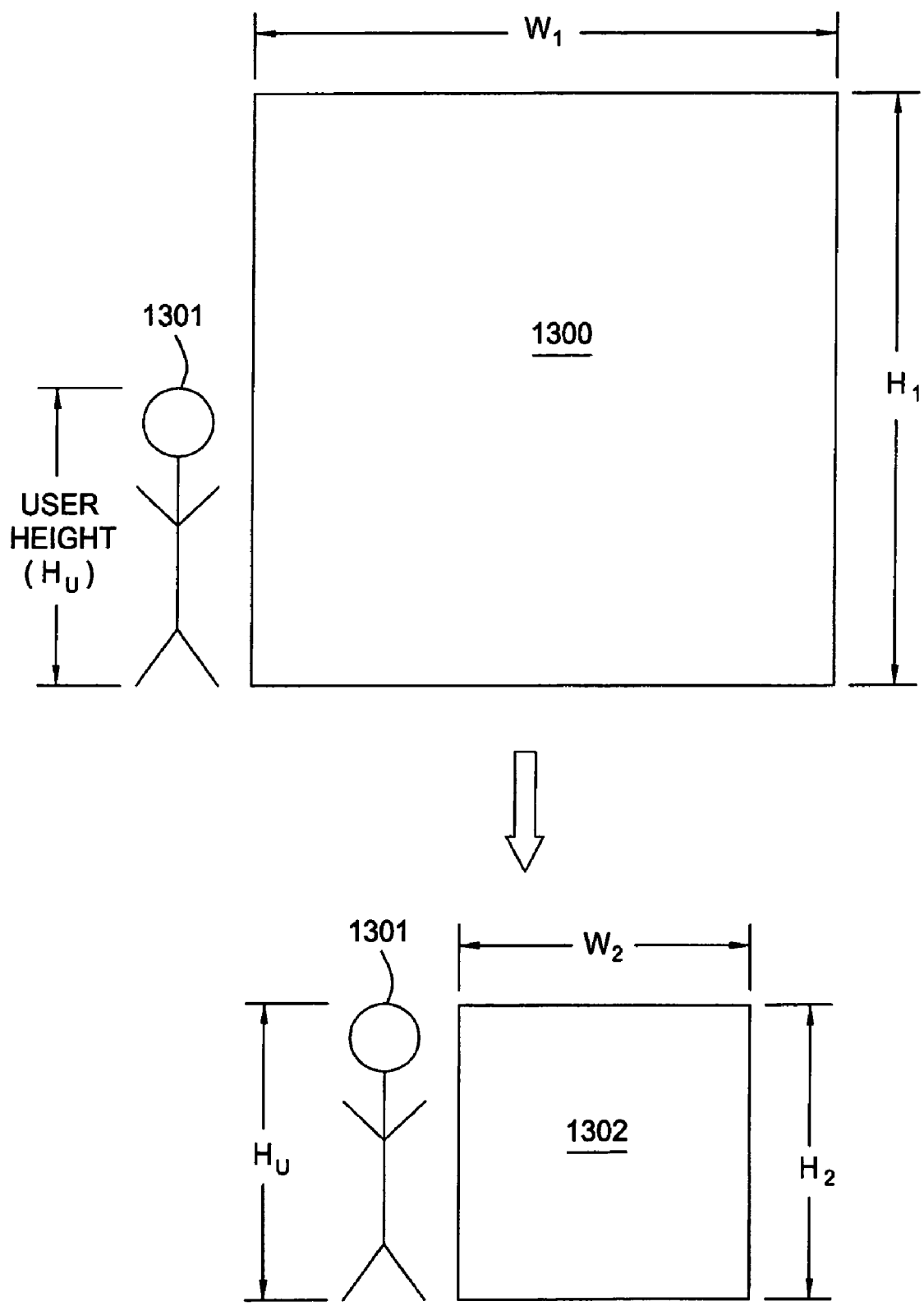
FIG. 13 depicts a calibration of a size of an image displayed based upon a determination of a user's height.

For example, FIG. 13 illustrates a calibration of a size of an unadjusted image 1300 based upon a determination of a height, $H_u$, of a user 1301. The unadjusted image 1300 has an initial width, $W_1$, and an initial height, $H_1$, that the unadjusted image 1300 would be displayed if the unadjusted image 1300 were to actually be displayed without the calibration. In practice, the unadjusted image 1300 can but does not have to be displayed prior to the calibration. In operation and in accordance with aspects of the invention described herein, the height, $H_u$, of the user 1301 is detected and adjustments are thereafter made to the unadjusted image 1300 to provide an adjusted image 1302 that is displayed. Adjusting of the unadjusted image 1300 calibrates the adjusted image 1302 to have an adjusted width, $W_2$, and an adjusted height, $H_2$, when displayed that makes the adjusted image 1302 more within a comfortable focal range and/or access of the user 1301.

As a further example, FIG. 14 depicts a rearrangement of objects, O, shown within an unadjusted image 1400 based upon a determination of a height, $H_u$, of a user 1401. The unadjusted image 1400 has an initial layout with the objects, O, arranged within the unadjusted image 1400 at a first location. The objects, O, can be interactive objects or non-interactive text/graphics. Upon detecting the height, $H_u$, of the user 1401, adjustments are made to the unadjusted image 1400 to rearrange the objects, O, and provide an adjusted image 1402 that is displayed with the same dimensions as the unadjusted image 1400. The adjusted image 1402 has the objects, O, arranged within the adjusted image 1400 at a second location. Similar to the example shown in FIG. 15, the calibration of the adjusted image 1402 that is displayed places the objects, O, more within a comfortable focal range and/or access of the user 1401.

For some embodiments, the standing height can be replaced with a sitting height for applications where the user is seated during operation of the interactive system. Further, the height of the user is a sitting height in the case of a wheelchair user. Identification of a chair or wheelchair that the user is seated in can occur if necessary with image differencing, as discussed above. In addition to the automatic detection of the user's height with the camera 310, the camera 310 can be used to detect other characteristics of the user. For example, the image processor parameters 330 can provide information indicating that the user has a walking aide such as a walker or cane that can limit or determine a preferred side for the user's reaches. Like a chair or wheelchair, the walking aide is a distinct and recognizable feature apparent and identifiable with image differencing as one of the object parameters. Hence, the display controller 340 can change the image to accommodate this limited reach of the user due to use of the walking aide. Similarly, the information provided by the image processor parameters 330 can detect impaired vision based on the user having glasses, a guide cane or a seeing guide dog. The interactive system can thereafter enlarge the image and/or switch to audio based interaction.

Additionally, the interactive system can automatically account for other external factors affecting the user's ability to easily interact with the image. For example, any object or obstruction near the user can limit the ability of the user to move while interacting with the image. These objects or obstructions can be imaged with the camera 310 and output as object parameters of the image processor parameters 330. For example, a table or shopping cart adjacent the user can prevent the user from easily accessing the image beyond the start of the table. Accordingly, the display controller module 340 can reconfigure the image to account for the user's obstructed movement due to the table. As a further example, the user can be in a vehicle at a drive up area where the interactive system is in operation. For example, a drive thru at a restaurant may provide an interactive menu. Detection of the vehicle height with the camera 310 can determine the appropriate location for the image to be displayed so that the user does not have to stretch or open the vehicle's door to interact with the image depending on whether the user is in a compact vehicle or a large sport utility vehicle, for example.

As shown in FIG. 15, the interactive system can make further adjustments upon detection of the user being a group of multiple individuals 1501, 1503, 1505. As with other embodiments, these adjustments to an unadjusted image 1500 provide an adjusted image 1502 that is displayed and is based on attributes of the user. Again, the camera 310 (shown in FIG. 3) and image module 320 (shown in FIG. 3) can provide the information that indicates a presence of the group of multiple individuals 1501, 1503, 1505. In this respect, the display controller module 340 (shown in FIG. 3) can be programmed to maintain the adjusted image 1502 at an initial setting for the first individual to approach; adjust the unadjusted image 1500 based on an average or best fit of all the individuals 1501, 1503, 1505; adjust the unadjusted image 1500 based on an extremity of the individuals, e.g., the individual 1503 that is the shortest; change the unadjusted image 1500 to be best suited for the individual 1505 that is closest to the display; or customize the unadjusted image 1500 in a round-robin fashion for each individual 1501, 1503, 1505 until one of the individuals interacts with the image to lock in the configuration adapted for that particular individual.

Another embodiment for calibrating the image displayed by the projector 350 involves manually specifying the attributes of the user. In practice, the user sweeps their hand over an appropriate area of the display surface corresponding to boundaries of the user's comfortable reach. This motion is detected with the camera 310 and information about these boundaries is output from the image module 320 as the image processor parameters 330. Thereafter, the display controller module 340 adjusts the image or at least any interactive portions of the image to fit the boundaries identified by the hand sweeping pattern.

Figure 16:
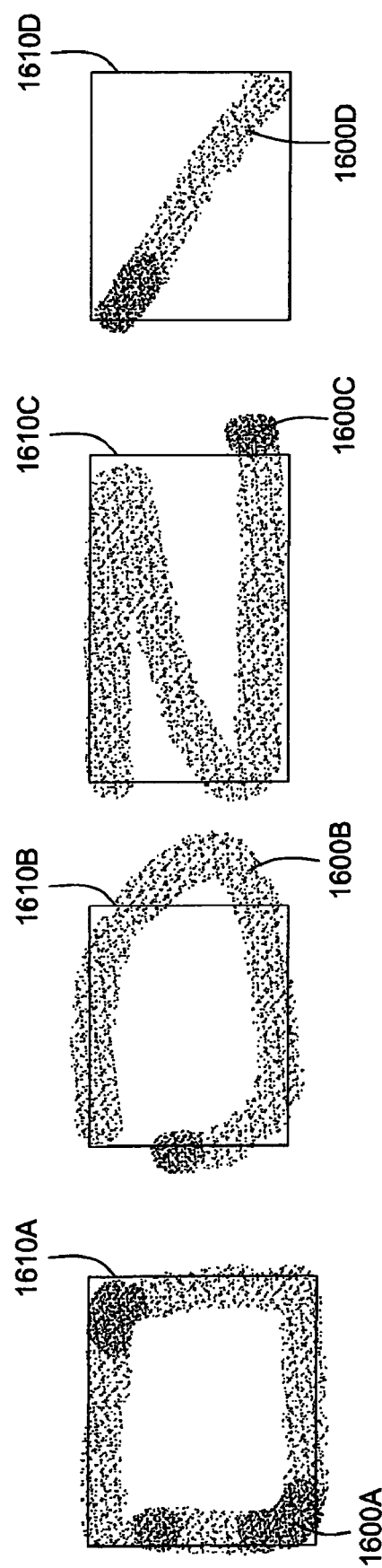
FIG. 16 depicts an assortment of user actions that facilitate defining that user's range during calibration of an image to be displayed.

FIG. 16 illustrates suitable hand sweeping patterns 1600A-D and the corresponding available interactive area 1610A-D represented by the patterns 1600A-D. The patterns 1600A-D can be selectable by the user or prompted by the apparatus. The various sweeping motions forming the patterns 1600A-D are respectively rectangular, circular, z-shaped and diagonal. These options for the patterns 1600A-D determine whether the user is incapable of or uncomfortable with making any one these motions. Any interactive menus included in the image being displayed are accordingly arranged to be within the available interactive area due to the display controller module 340 adjusting the image. This calibration ensures that the user can easily access the menus.

In one embodiment, manual calibration (such as that described above) of the image can be used in conjunction with a fully automatic calibration. For example, the display controller module 340 can select an initial image size and position to be displayed by the projector 350 based on the automatic dynamic calibration which utilizes sensed height of the user as described above. Thereafter, the user can optionally further define boundaries for the image or the interactive region thereof with any one of the hand sweeping patterns 1300. For some embodiments, hyperlinks within the image can enable the user to optionally further calibrate the image upon completing any of the calibrations by selecting options to reposition and/or resize the image. Additionally, any attribute of the user, such as use of a cane or wheelchair, poor eyesight, etc. can be manually entered in addition to or instead of being detected.

Other options for providing the input information relating to the user exist other than using the images from the camera 310. In this respect, FIG. 1 illustrates the sensors 110 being of different types. As examples, scales, microphones and pressure sensors can all provide information about the user to facilitate calibration of the image to the user. For example, weight of the user can provide information about the size of the user similar to or in combination with the determination of the user's height. Further, pressure sensors in a floor can detect the number of individuals and their respective locations relative to the display. Additionally, microphones can be used to detect a presence of the user and/or receive voice recognizable commands from the user to calibrate the image.

Figure 17:
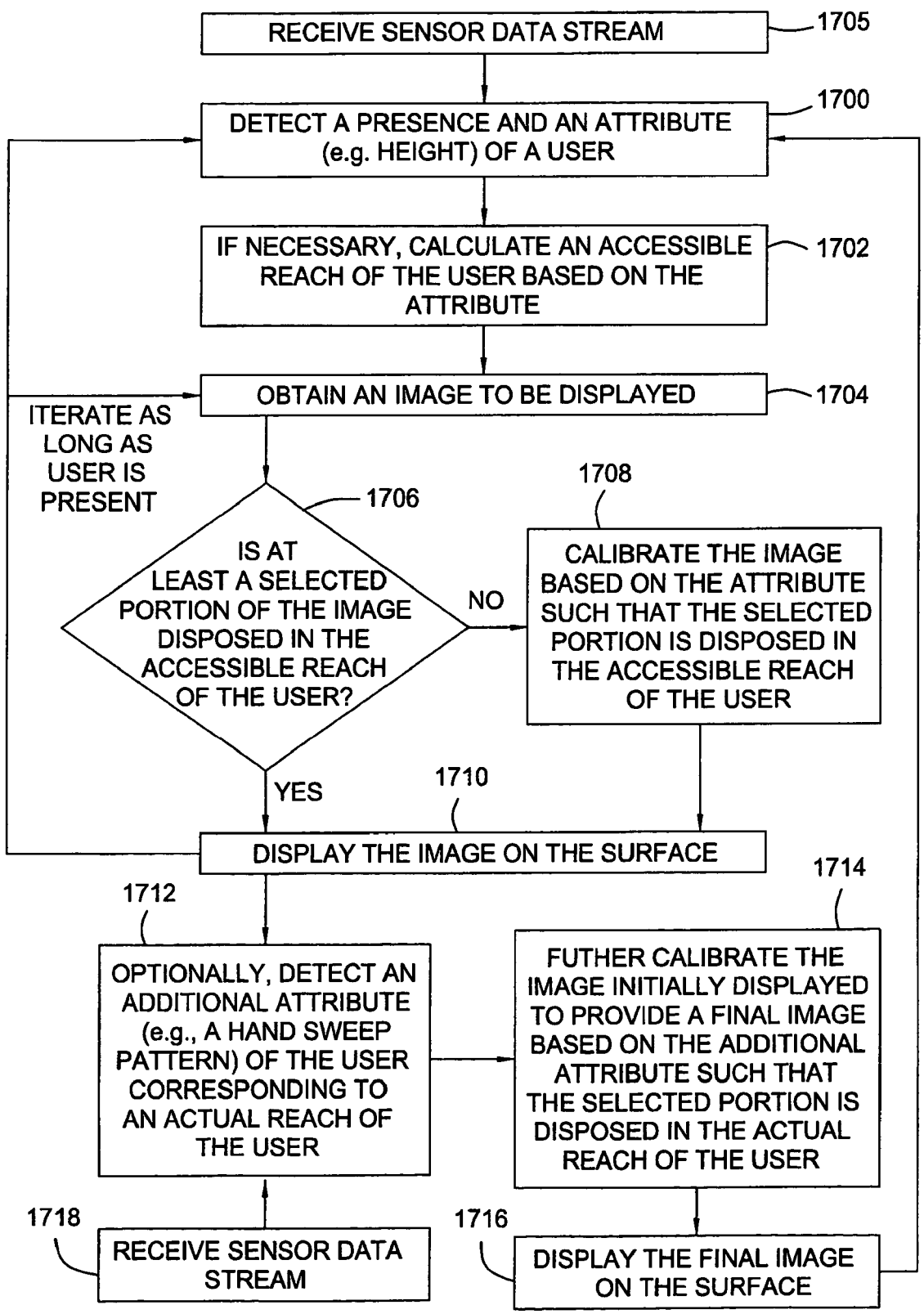
FIG. 17 depicts a flowchart of a method to project a calibrated image based on a particular user.

FIG. 17 shows a method of projecting a calibrated image based on a particular user in accordance with the embodiments described above. A sensor data stream is received at step 1700 and processed in step 1705 by, for example, the image processor 320 shown in FIG. 3 to detect a presence and an attribute of a user. For some embodiments, the attribute corresponds to an accessible reach of the user from substantially a single position. Alternatively, the attribute can correspond to a comfortable focal point of the user, an age of the user, or any other characteristic associated with the user. If necessary, a calculation step 1702 determines an accessible reach of the user based on the attribute, such as a height of the user.

A processing step 1704 then obtains an image to be displayed. A decision step 1706 checks to see if at least a selected portion (e.g., interactive menus or hyperlinks) of the image is disposed in the accessible reach of the user. If the decision in step 1706 is affirmative, no adjustment to the image is necessary and a display device is activated with the image sent thereto for display of the image in step 1710. If the decision in step 1706 is negative, calibrating the image for the user is required in step 1708. The step 1708 determines the appropriate manner to resize, reposition, and/or adjust the layout of the image to suit the user. Upon calibrating the image for the user, the image is sent to the display device to be displayed in step 1710.

Thereafter, the sensor data stream is optionally processed at step 1718 to detect an additional attribute of the user at step 1712. The additional attribute can be a hand sweep of the user and can correspond to an actual reach of the user. Calibrating the image initially displayed for the user occurs in step 1714 to provide a final image, which is displayed in step 1716. After displaying the image at step 1710 or step 1716, the method repeats for future images to be displayed thus forming a continuous loop that enables the dynamic automatic calibration of the future images for each user that approaches the interactive system.

In addition to calibration for different users, the foregoing embodiments enable adjusting to movements of the same user. For example, lateral movement and/or vertical movement (e.g., when the user stands up from a sitting position) can change the attribute detected for the same user such that further calibration for the same user is required. This further calibration can be accomplished based on any of the embodiments disclosed herein.

Aspects of the method shown in FIG. 17 can be integrated into the other methods disclosed herein. For example, steps 1700, 1702, 1706 and 1708 can occur at anytime in the methods illustrated by flowcharts in FIGS. 2 and 4 with the image obtained in steps therein prior to the step of sending the image to the display device. In other words, the flowchart illustrated in FIG. 17 shows only the calibration steps for incorporation with any interactive system and accompanying methods prior to displaying the image that is calibrated for a particular user.

While the changes made by the display controller module 340 discussed in this section heretofore relate to position, layout, size and orientation of the image, content of the image as shown in FIG. 18 may also be customized for a particular user. With reference still to FIG. 3, the camera 310 and image module 320 can provide information to the display controller indicating that the user is a child so that the content can be changed accordingly. For example, any interactive menus can change from words in an unadjusted image 1800 to pictorial figures in an adjusted image 1802 based on a determination that a user 1801 is too small to likely be able to read. In a retail setting, this content matching with the user that is a child can involve displaying images relating to toys or images with selected clothing based on the user's size. As another example, microphones used as the sensors 110 (shown in FIG. 1) can detect gender and/or spoken language such that the image can be adjusted accordingly such as by displaying text in the user's language.

While the foregoing is directed to embodiments of the present invention, other and further embodiments of the invention may be devised without departing from the basic scope thereof, and the scope thereof is determined by the claims that follow.

What is claimed is:

1. A method of calibrating a display for a user in an environment to enable content of the display to be accessible to the user while the user is in the environment, comprising:
   receiving a sensor data stream from a sensor monitoring the environment;
   processing the sensor data stream to determine a presence of the user in the environment and detect a physical attribute associated with the user; wherein the physical attribute is selected from at least one of a height of the user and an accessible reach of the user from substantially a single position of the user;
   adjusting one or more aspects of an unadjusted image based on the attribute to produce an adjusted image from the unadjusted image, wherein the adjusting occurs automatically in absence of any interaction by the user with the unadjusted image; and
   displaying the adjusted image on a surface in a selected one of a plurality of available display zones disposed in the environment sufficiently near to the user in order to allow the user to effectively interact with the content of the adjusted image.

2. The method of claim 1, wherein adjusting one or more aspects of the unadjusted image includes adjusting at least one of a size, location and layout of at least a portion the unadjusted image.

3. The method of claim 1, wherein adjusting the one or more aspects of the unadjusted image disposes at least a selected portion of the unadjusted image that is outside of the accessible reach of the user within the accessible reach of the user in the adjusted image.

4. The method of claim 1, further comprising processing the sensor data stream to determine an additional physical attribute of the user to further calibrate the adjusted image initially displayed.

5. The method of claim 4, wherein processing the sensor data stream to determine the additional physical attribute of the user includes determining a hand sweep area of the user.

6. The method of claim 1, further comprising, if the user is a group of individuals, defining the attribute of the user as one of: an average physical attribute of all of the individuals, and a physical attribute that is based on one of the individuals closest to the surface.

7. The method of claim 1, further comprising, if the user is a group of individuals:
   defining the attribute of the user based on one of the individuals; and
   repeating the adjusting and the displaying while redefining the attribute of the user for each individual between repetitions until one of the individuals interacts with the adjusted image.

8. The method of claim 1, wherein processing the sensor data stream further comprises detecting a spoken language of the user, and
   wherein adjusting one or more aspects of the unadjusted image includes changing a displayed language.

9. The method of claim 1, wherein processing the sensor data stream further comprises detecting a size of the user, and
   wherein adjusting one or more aspects of the unadjusted image includes changing words in the unadjusted image to pictorial figures in the adjusted image based on a likelihood that the user is a child due to the size of the user.

10. The method of claim 1, further comprising:
    detecting objects which interfere with an ability of the user to interact with the adjusted image; and
    reconfiguring the image to account for the user's obstructed interactions.

11. The method of claim 1, further comprising distorting an undistorted image so that when displayed, a substantially undistorted image appears to the user in the selected display zone.

12. A computer readable storage medium containing a program which, when executed, performs an operation to enable content of a display to be accessible to a user while the user is in an environment, comprising:
    processing a sensor data stream comprising a set of objects and a set of interaction parameters to determine a presence of the user in the environment and detect a physical attribute associated with the user and an interaction of the user with the environment; wherein the physical attribute is selected from at least one of a height of the user and an accessible reach of the user from substantially a single position of the user;
    adjusting one or more aspects of an unadjusted image based on the attribute to produce an adjusted image from the unadjusted image, wherein the adjusting occurs automatically in absence of any interaction by the user with the unadjusted image; and
    sending the adjusted image to a selected one of a plurality of display zones disposed in the environment within an acceptable range of the interaction, thereby allowing the user to effectively interact with the content of the image.

13. The computer readable storage medium of claim 12, further comprising changing a content of the image based on the attribute, wherein the attribute is a height of the user.

14. A system to enable content of a display to be accessible to a user while the user is in an environment, comprising:
    a display device capable of displaying an image on a surface;
    a sensing device capable of sensing a physical attribute associated with the user; wherein the physical attribute is selected from at least one of a height of the user and an accessible reach of the user from substantially a single position of the user; and
    a display controller configured to adjust the image based on the attribute to calibrate the image automatically in absence of any interaction by the user with the image, wherein adjustments to the image include disposing at least a selected portion of the content of the image disposed in the environment within the accessible reach of the user from substantially a single position of the user.

15. The system of claim 14, wherein the sensing device is a camera.

16. The system of claim 14, wherein the display device is a projector.

17. The method of claim 14, wherein the display controller is configured to adjust the image by:
    calibrating the unadjusted displayed image by causing the user to make certain predefined motions; and
    adjusting boundaries of the displayed image based on detection of the predefined motions.

* * * * *